United States Patent
Gitnes

(10) Patent No.: US 12,281,691 B2
(45) Date of Patent: Apr. 22, 2025

(54) SHOCK ABSORBING ACTUATOR END STOP

(71) Applicant: Moog Inc., East Aurora, NY (US)

(72) Inventor: Seth E. Gitnes, Snohomish, WA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 17/913,667

(22) PCT Filed: Mar. 24, 2021

(86) PCT No.: PCT/US2021/023814
§ 371 (c)(1),
(2) Date: Sep. 22, 2022

(87) PCT Pub. No.: WO2021/195168
PCT Pub. Date: Sep. 30, 2021

(65) Prior Publication Data
US 2023/0115404 A1 Apr. 13, 2023

Related U.S. Application Data

(60) Provisional application No. 62/994,894, filed on Mar. 26, 2020.

(51) Int. Cl.
*F16H 25/20* (2006.01)
*F16H 25/22* (2006.01)

(52) U.S. Cl.
CPC ..... *F16H 25/2015* (2013.01); *F16H 25/2204* (2013.01)

(58) Field of Classification Search
CPC ......... F16H 25/2015; F16H 2025/2463; F16H 25/2454; F16H 25/2021
See application file for complete search history.

(56) References Cited

U.S. PATENT DOCUMENTS

| | | |
|---|---|---|
| 3,203,257 A | 8/1965 | Geyer |
| 3,762,227 A | 10/1973 | Bohnhoff |
| 5,064,044 A | 11/1991 | Oketani et al. |
| 5,613,400 A | 3/1997 | Sato et al. |

(Continued)

FOREIGN PATENT DOCUMENTS

| | | |
|---|---|---|
| DE | 10 2011 080 914 A1 | 2/2013 |
| DE | 10 2012 210226 A1 | 12/2013 |
| JP | 2507933 B2 | 6/1996 |

*Primary Examiner* — Gregory Robert Weber
(74) *Attorney, Agent, or Firm* — Harter Secrest & Emery LLP

(57) ABSTRACT

A linear actuator comprising a shaft and a nut in engagement with the shaft such that the nut translates within a linear range of motion axially on a center axis relative to the shaft in response to relative rotation between the nut and the shaft, a stop positioned at a travel limiting position and having a rotational input portion and an axial output portion, the rotational input portion configured to rotate about the center axis relative to the shaft, the axial output portion constrained from rotating about the center axis relative to the shaft and configured to translate axially on the center axis relative to the rotational input portion in response to relative rotation between the axial output portion and the rotational input portion, and an axially compliant member configured to bias the axial output portion towards the travel limiting position.

7 Claims, 5 Drawing Sheets

(56) References Cited

U.S. PATENT DOCUMENTS

| | | | |
|---|---|---|---|
| 5,868,032 A | 2/1999 | Laskey | |
| 5,901,817 A | 5/1999 | Gitnes | |
| 8,109,165 B2 | 2/2012 | Himmelmann | |
| 8,424,401 B2 | 4/2013 | Shige et al. | |
| 9,303,743 B2 | 4/2016 | Wingett et al. | |
| 9,651,126 B2 * | 5/2017 | Lang | F16H 25/2454 |
| 9,670,999 B2 | 6/2017 | Gitnes | |
| 2002/0149268 A1 | 10/2002 | Yamada et al. | |
| 2012/0192662 A1 | 8/2012 | Kluge | |
| 2014/0305238 A1 | 10/2014 | Wingett et al. | |
| 2018/0180143 A1 | 6/2018 | Hawksworth et al. | |
| 2019/0315391 A1 | 10/2019 | Illés et al. | |

\* cited by examiner

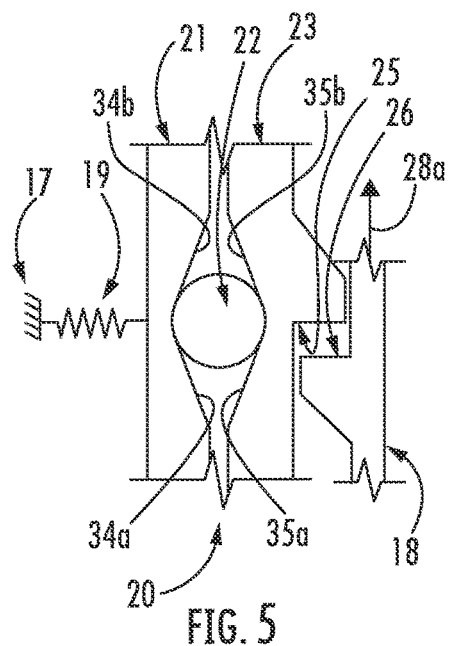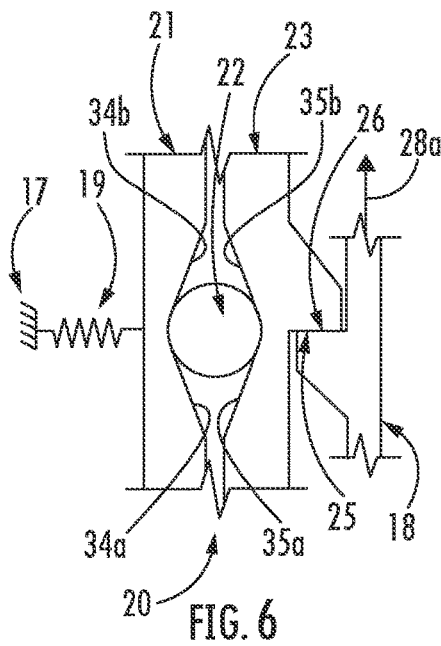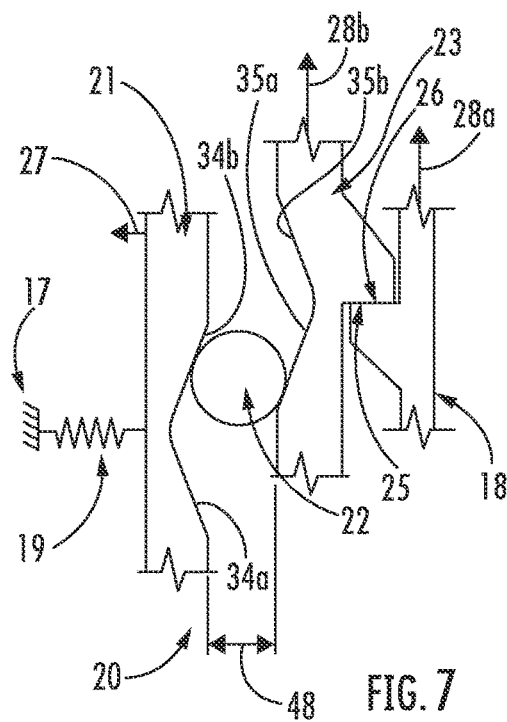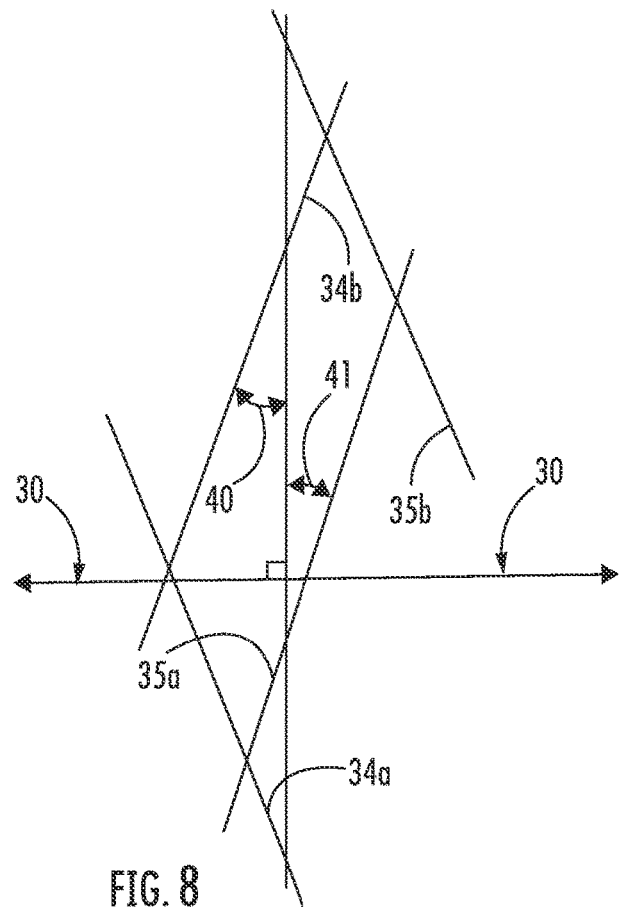

SHOCK ABSORBING ACTUATOR END STOP

TECHNICAL FIELD

The present invention relates generally to the field of ball screw actuators, and more specifically to an actuator having an improved shock absorbing end stop.

BACKGROUND ART

Ball screw actuators are well known in the art and generally include a screw in threaded engagement with a nut and driven by a motor. Relative rotation between the screw and the nut produces axial displacement between the screw and the nut. This axial displacement typically drives a linear stroke of an actuating mechanism. In such systems, one or more end stops may be used to limit actuator travel at fully retracted and/or fully extended positions and limit damage to the motor, ball screw or mechanical connections.

U.S. Pat. No. 8,109,165 is directed to a compliant non-jamming end of travel stop for a ball screw actuator. The ball screw actuator includes a torsion spring that is operatively arranged to absorb energy when first and second stops of the ball screw actuator engage at a travel limiting position.

SUMMARY

With parenthetical reference to the corresponding parts, portions or surfaces of the disclosed embodiment, merely for the purposes of illustration and not by way of limitation, the present disclosure provides a linear actuator (15) comprising: a shaft (16) orientated about a center axis (30); a nut (18) in engagement with the shaft (16) such that the nut (18) translates within a linear range of motion axially on the center axis (30) relative to the shaft (16) in response to relative rotation between the nut (18) and the shaft (16) about the center axis (30); a stop (20) positioned at a travel limiting position of the range of motion between the shaft (16) and the nut (18); the stop (20) having a rotational input portion (23) and an axial output portion (21); the rotational input portion (23) configured to rotate about the center axis (30) relative to the shaft (16); the axial output portion (21) constrained from rotating about the center axis (30) relative to the shaft (16) and configured to translate axially (27) on the center axis (30) relative to the rotational input portion (23) and the shaft (16) in response to relative rotation between the axial output portion (21) and the rotational input portion (23) about the center axis (30); and an axially compliant member (19) configured to bias the axial output portion (21) axially on the center axis (30) towards the travel limiting position.

The shaft (16) may comprise an outer ball track (43) and the nut (18) may comprise an inner ball track (44) and a plurality of balls (45) may be disposed in the outer ball track (43) and the inner ball track (44). The axially compliant member (19) may comprise a spring acting between the shaft (17) and the axial output portion (21). The stop (20) may comprise a plurality of balls (22) disposed axially between the rotational input portion (23) and the axial output portion (21).

The rotational input portion (23) may comprise a first annular cam surface (35a, 35b) and the axial output portion (21) may comprise a second annular cam surface (34a, 34b) facing the first annular cam surface (35a, 35b). The plurality of balls (22) may be disposed axially between the first annular cam surface (35a, 35b) and the second annular cam surface (34a, 34b).

The nut (18) may comprise a torsional input stop (26) and the rotational input portion (23) of the stop (20) may comprise a torsional output stop (25) configured such that the rotational input portion (23) of the stop (20) rotates in a first direction (28b) about the center axis (30) relative to the shaft (16) with rotation of the nut (18) in a first direction (28a) about the center axis (30) relative to the shaft (16) when the torsional output stop (25) and the torsional input stop (26) axially overlap and rotationally abut (FIGS. 6 and 7).

BRIEF DESCRIPTION OF THE DRAWINGS

FIG. 5 is a schematic view of the ball screw end stop assembly shown in FIG. 2 in an axially overlapping position.

FIG. 6 is a schematic view of the ball screw end stop assembly shown in FIG. 2 in an axially overlapping and rotationally abutting position.

FIG. 7 is a schematic view of the ball screw end stop assembly shown in FIG. 2 in a shock absorbing position.

FIG. 8 is a schematic view of the pocket surfaces of the ball ramp assembly shown in FIG. 5.

DETAILED DESCRIPTION OF THE EMBODIMENTS

Figure 1:
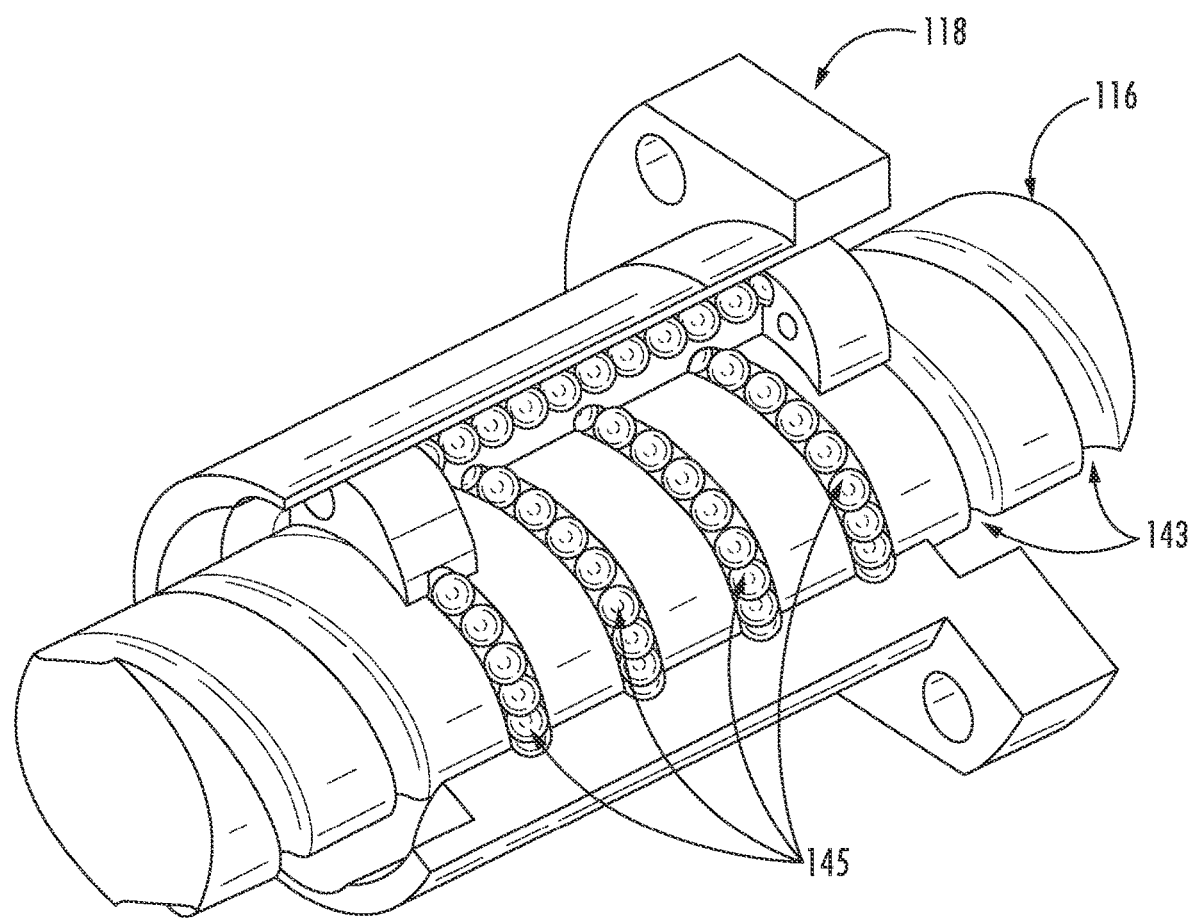
FIG. 1 is perspective partial cut-away view of a ball screw assembly known in the prior art.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 shows a type of ball screw assembly known in the prior art. As shown, the ball screw assembly uses the rolling motion of balls 145 positioned between a shaft 116 and a nut 118 to produce relative motion between the shaft 116 and the nut 118. The ball bearing assembly 118 acts as the nut while the threaded shaft 116 provides a helical raceway 143 for ball bearings 145. The ball screw assembly may thereby be operated as a mechanical linear actuator that translates rotational motion to linear motion with reduced friction.

Figure 2:
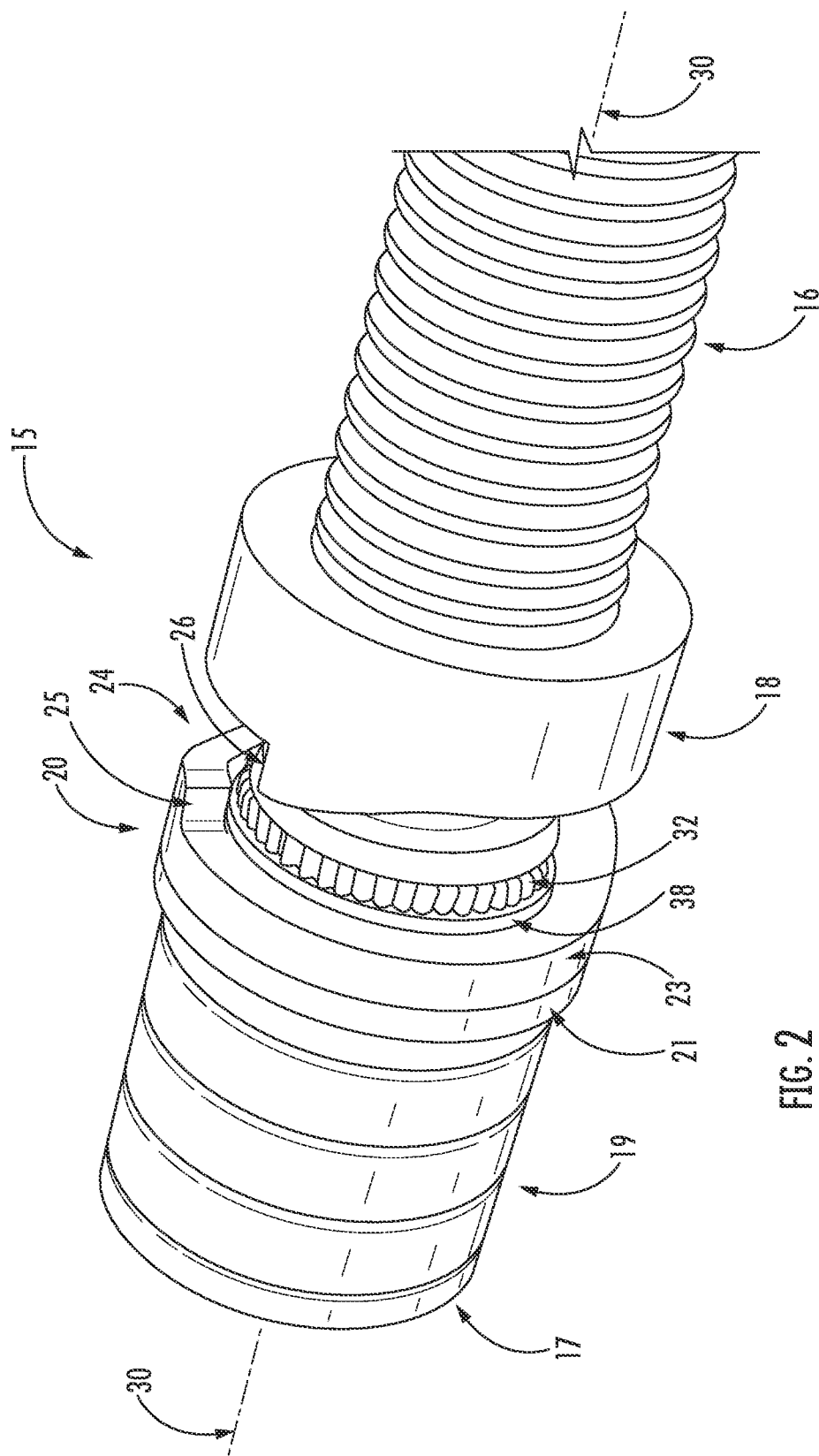
FIG. 2 is a perspective view of a first embodiment of an improved ball screw end stop assembly.
Figure 3:
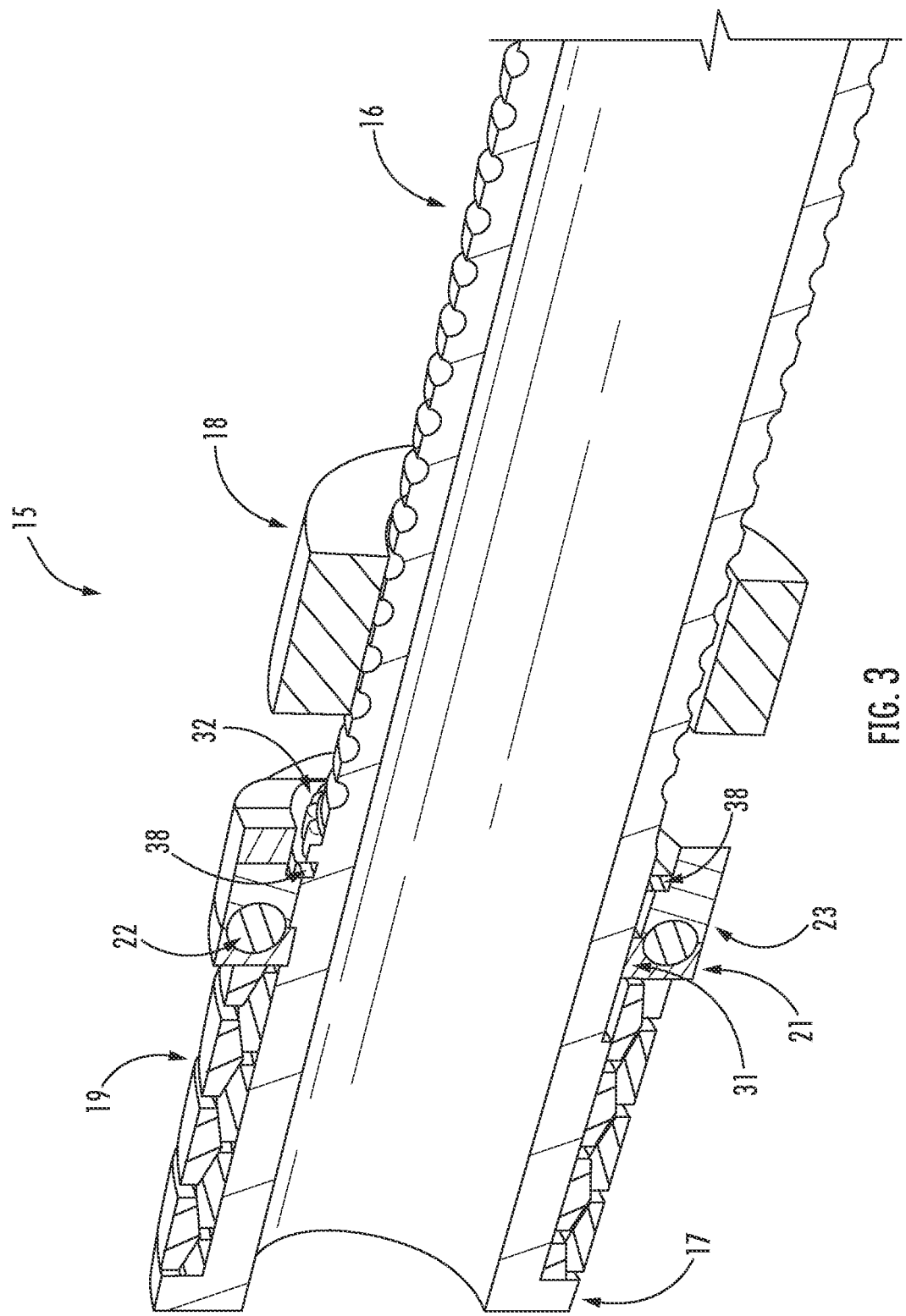
FIG. 3 is a longitudinal vertical cross-sectional perspective view of the ball screw end stop assembly shown in FIG. 2.
Figure 4:
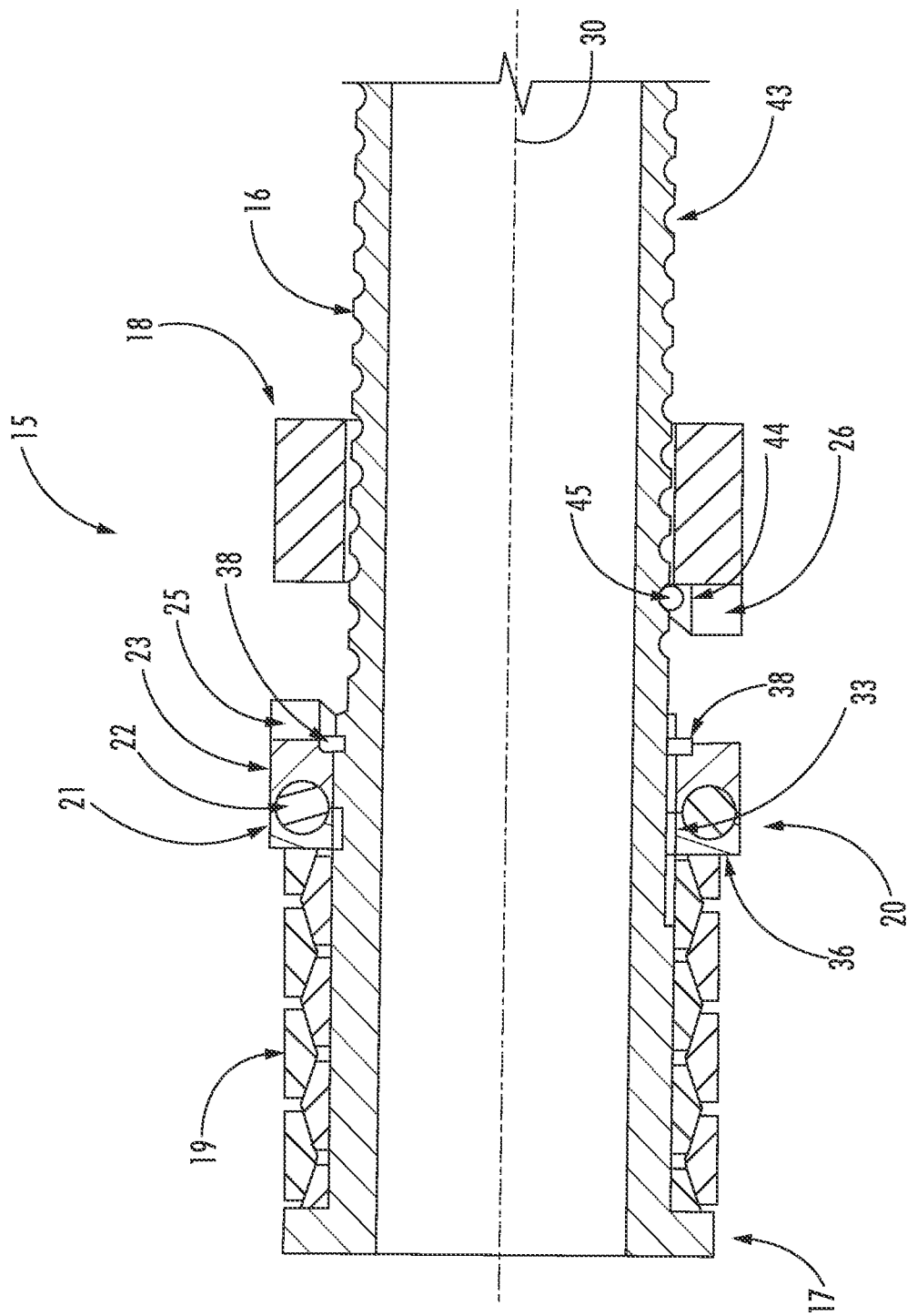
FIG. 4 is a longitudinal vertical cross-sectional view of the ball screw end stop assembly shown in FIG. 2.

With reference to FIGS. 2-3, an improved ball screw end stop assembly is provided, a first embodiment of which is generally indicated at 15. As shown, assembly 15 generally includes ball screw shaft 16 oriented about axis 30, ball screw nut 18 in rotational engagement with ball screw shaft 16, spring 19 orientated around one end of ball screw shaft 16, ball ramp assembly 20 orientated axially between spring 19 and ball screw nut 18, and torsional stop 24 orientated between ball ramp assembly 20 and ball screw nut 18. As shown, ball ramp assembly 20 generally includes input ramp 23, output ramp 21, and a plurality of balls 22 therebetween. Shock absorbing end stop 15 provides a rotational stop at the end of the desired axial travel of nut 18 relative to ball screw shaft 16 that reduces both the axial load on shaft 16 of ball screw assembly 15 and the torsional load on the nut 18 and shaft 16 interface of ball screw assembly 15.

As shown, ball screw 16 includes helical track 43 and nut 18 includes opposed track 44, with ball bearings 45 therebetween. As shown, the left side of nut 18 includes first face 26 of torsional dog stop 24 and the right side of input ramp 23 includes second face 25 of torsional dog stop 24 that is configured to mate with first face 26 of torsional dog stop 24 on nut 18. Accordingly, when the respective mating faces 25 and 26 of torsional dog stop 24 are rotated such that they axially overlap and rotationally oppose each other and come into contact, as shown in FIGS. 6 and 7, the torque and rotation 28*a* of nut 18 about axis 16 is transferred to input ramp 23 of ball ramp assembly 20. Input ramp 23 is rotatable about the end of shaft 16 and axis 30, so that input ramp 23 rotates 28*b* about axis 30 with rotation 28*a* of nut 18 about axis 30 on shaft 16 when in mating engagement.

As shown, output ramp 21 of ball ramp assembly 20 includes longitudinally extending inner splines 31 that interface 33 with similarly extending splines 32 on the outside surface of the end of shaft 16. As a result, output ramp 21 of ball ramp assembly 20 is constrained and not free to rotate about shaft 16 and axis 30 but may move axially 27 to the left on shaft 16.

Ball ramp assembly 20 includes annular ring of balls 22 located between opposed ramped surfaces 35*a*, 35*b* and 34*a*, 34*b* of input ramp 23 and output ramp 21, respectively. As shown in the progression of FIGS. 5-7, when input ramp 23 is rotated about shaft 16 and axis 30 in first direction 28*a*, output ramp 23 is restrained from such rotation by its splined interface 33 with the end of shaft 16. The relative movement of input ramp 23 to output ramp 21 with balls 22 between them therefore causes axial movement 27 of output ramp 21 to the left. Such axial load 27 is then absorbed by spring 19 acting between annular retaining end flange 17 of shaft 16 and annular end surface 36 of output ramp 21.

In this embodiment, spring 19 is a friction spring orientated on shaft 16 about axis 30 and having a stack of outer and inner rings with opposed cone surfaces and lubricant assembled to provide a cylindrical friction spring column oriented about axis 30. Spring 19 has a high damping potential and absorbs kinetic energy with minimal resonance. Spring 19 biases output ramp 21 axially to the right against input ramp 23 and annular retaining ring 38 of shaft 16. Spring 19 acts as an axial shock absorber with respect to axial load 27. While a friction spring is employed in this embodiment, other types of springs or other energy absorbing alternatives may be used. For example, and without limitation, a coil spring, a Belleville washer or disc spring stack, an elastomeric spring, or a hydraulic damper may be employed as alternatives.

Thus, ball screw end stop assembly 15 includes ball ramp assembly 20 between torsional dog stops 24 and spring 19 that converts rotary motion and torsional load 28*a* and 28*b* of torsional dog stops 24 into linear motion and axial load 27, which is then applied to spring 19 to absorb the energy of the impact. The axial loads 27 developed by ball ramp assembly 20 are isolated from the ball bearings 45 in nut 18 of the ball screw assembly by annular retaining ring 38 extending from shaft 16, which prevents axial movement of input ball ramp 23 to the right. Thus, fatigue damage is not introduced into the ball screw assembly.

Accordingly, stop 26 on nut 18 of ball screw end stop assembly 15 may be rotated so as to move to the left until it engages stop 25 on input ramp 23. At this point, input ramp 23 begins to rotate 28*b* with rotation 28*a* of nut 18 about axis 30 and shaft 16. However, output ramp 21 is anti-rotated to shaft 16 via spline interface 33, so it cannot rotate. The relative rotation between input ramp 23 and output ramp 21 forces the ramps to axially separate a separation distance 48 based on the angles 40, 41 of the opposed ball ramp pockets 34*a*, 34*b* and 35*a*, 35*b*. Input ramp 23 is prevented from moving axially to the right on shaft 16 by annular retaining ring 38, which forces output ramp 21 to move axially 27 to the left, thereby compressing spring stack 19. Spring stack 19 absorbs the kinetic energy of system 15 while compressing, preventing excessive torque spikes from occurring in the gear train of the actuator at the travel limiting position of the actuator.

Ball screw end stop assembly 15 may be arranged to act, for example and without limitation, between an airfoil surface and a fuselage of an aircraft to adjust the orientation of the airfoil surface relative to the fuselage. A motor drives relative rotation between ball screw 16 and ball nut 18 to cause axially-directed relative motion between ball screw 16 and ball nut 18. By way of non-limiting example, the motor may be an electric motor or a hydraulic motor.

Ball screw end stop assembly 15 protects the ball screw from axial loads developed by contacting end stop 17 and absorbs the torsional kinetic energy of the drive motor in the actuator. Ball screw end stop assembly 15 provides a rotational stop at the end of travel of the ball screw that prevents additional axial load from being developed by the lead or shaft of the ball screw through torsional dog tooth stop 24. Ball screw end stop assembly 15 is an improvement over a system that only includes a torsional dog stop and spring. The problem with just using a torsional dog stop and a spring is that if the subject actuator is equipped with a high speed hydraulic or electric motor, the kinetic energy of the driving motor may not be adequately absorbed by the stop and the gear train between the motor and the stop. Because the kinetic energy can be very high and the load path between the motor and the ball screw stops can be very stiff, the torque spike resulting from a full speed impact into the torsional dog tooth stops can be damaging to the gear train or require a much heavier design to accommodate the loads. And if the stops are impacted frequently, particularly on a telescoping ball screw wherein the intermediate ball screw stops are impacted every operation, this can become a fatigue issue for the ball screw and drive train components. The present system is an improvement in this regard.

Several additions modifications can be made to the disclosed embodiments. For example and without limitation, opposed ball ramp pockets 34*a*, 34*b* and 35*a*, 35*b* of input ramp 23 and output ramp 21 may have alternative configurations, angles and cam surfaces to provide a desired range and rate of axial separation depending on the application. Also, alternative shaft thread configurations or profiles and helical raceways between the ball shaft and nut may be employed as well as different ball return systems. As yet another alternative, a lead screw and nut may be employed without ball bearings.

Therefore, while a form of the ball screw end stop assembly has been shown and described, and several modifications discussed, persons skilled in this art will readily appreciate that various additional changes may be made without departing from the scope of the invention.

What is claimed is:

1. A linear actuator comprising:
   a shaft orientated about a center axis;
   a nut in engagement with said shaft such that said nut translates within a linear range of motion axially on said center axis relative to said shaft in response to relative rotation between said nut and said shaft about said center axis;
   a stop positioned at a travel limiting position of said range of motion between said shaft and said nut;
   said stop having a rotational input portion and an axial output portion;
   said rotational input portion configured to rotate about said center axis relative to said shaft and having a torsional output stop configured to rotationally engage a torsional input stop of said nut at said travel limiting position such that said rotational input portion of said stop rotates about said center axis relative to said shaft with rotation of said nut about said center axis relative to said shaft when said torsional input stop of said nut rotationally engages said torsional output stop of said rotational input portion of said stop at said travel limiting position;
   said axial output portion constrained from rotating about said center axis relative to said shaft and configured to translate axially on said center axis relative to said rotational input portion and said shaft in response to relative rotation between said axial output portion and said rotational input portion about said center axis; and
   an axially compliant member configured to bias said axial output portion axially on said center axis towards said travel limiting position.

2. The linear actuator set forth in claim 1, wherein said shaft comprises an outer ball bearing track and said nut comprises an inner ball bearing track and comprising a plurality of balls bearings disposed in said outer ball bearing track and said inner ball bearing track.

3. The linear actuator set forth in claim 1, wherein said axially compliant member comprises a spring acting between said shaft and said axial output portion.

4. The linear actuator set forth in claim 1, wherein said stop comprises a plurality of balls disposed axially between said rotational input portion and said axial output portion.

5. The linear actuator set forth in claim 4, wherein said rotational input portion comprises a first annular cam surface and said axial output portion comprises a second annular cam surface facing said first annular cam surface.

6. The linear actuator set forth in claim 5, wherein said plurality of balls are disposed axially between said first annular cam surface and said second annular cam surface.

7. The linear actuator set forth in claim 1, wherein said torsional input stop of said nut and said torsional output stop of said rotational input portion of said stop are configured to axially overlap and rotationally abut when said torsional input stop of said nut rotationally engages said torsional output stop of said rotational input portion of said stop at said travel limiting position and such that said rotational input portion of said stop rotates in a first direction about said center axis relative to said shaft with rotation of said nut in a first direction about said center axis relative to said shaft when said torsional output stop and said torsional input stop axially overlap and rotationally abut.

* * * * *